April 14, 1925.
H. E. McCRAY
CARBURETING DEVICE
Filed Sept. 6, 1921
1,533,196
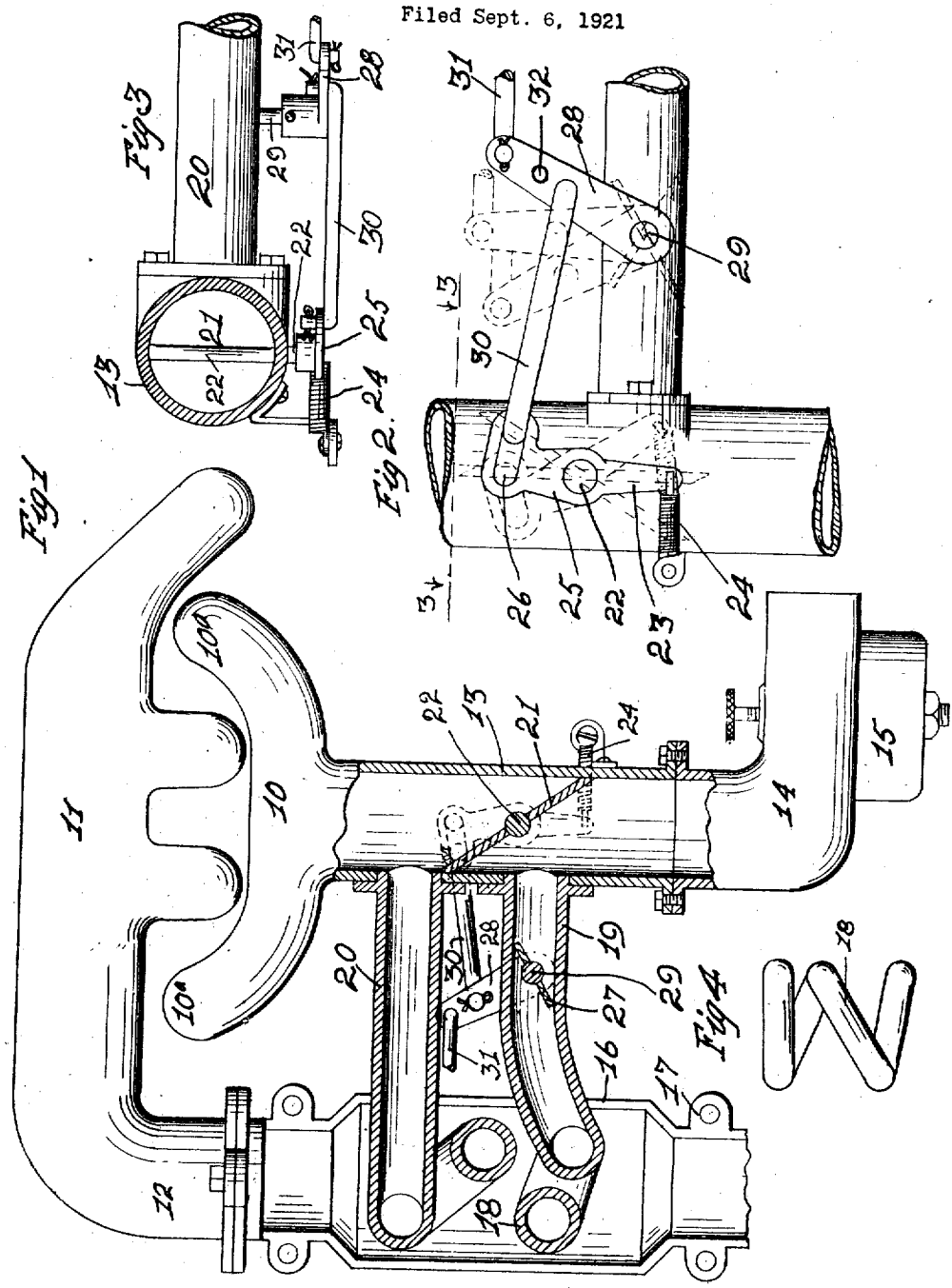

Patented Apr. 14, 1925.

1,533,196

UNITED STATES PATENT OFFICE.

HAROLD E. McCRAY, OF WATERLOO, IOWA, ASSIGNOR TO WATERLOO GASOLINE ENGINE COMPANY, OF WATERLOO, IOWA.

CARBURETING DEVICE.

Application filed September 6, 1921. Serial No. 499,002.

*To all whom it may concern:*

Be it known that I, HAROLD E. McCRAY, a citizen of the United States, and resident of Waterloo, in the county of Black Hawk and State of Iowa, have invented a certain new and useful Carbureting Device, of which the following is a specification.

The object of my invention is to provide a practical structure whereby the fuel mixture supplied to the cylinders of an internal combustion engine may be subjected to heat supplied by the exhaust gases from the engine during the time the engine is working on partial load and consequent reduced compression, but when the load is increased to a point where the compression and heat therefrom is sufficient to vaporize the fuel within the cylinders, the fuel mixture will not be subjected to the heat of the exhaust gases but will be supplied directly to the intake manifold and cylinders.

My invention is designed for use in carbureting fuels, especially the heavier fuels such as kerosene, distillate, etc., but may be used to advantage with any suitable hydrocarbon fuel.

The usual practice has heretofore been to add heat to the mixture of fuel and air where the heavier fuels are used, to assist in the vaporization of such heavier fuels, it being found impossible with the ordinary engine to satisfactorily generate sufficient heat inside the cylinders to vaporize the incoming mixture for all speeds and loads. There is an objection, however, to preheating the mixture, for it is evident that the addition of heat to the mixture before it enters the engine cylinders expands the mixture approximately in proportion to its absolute temperatures before and after the application of such heat. It is therefore impossible to attain the same volumetric efficiency at full load where the mixture is preheated that would be possible if the mixture was taken in cold. There is further objection to preheating the fuel mixture at full load and full compression, in that the high temperature of the incoming charge is apt to be raised by the heat of compression to a point where self ignition or detonation occurs.

I have discovered that there is sufficient heat generated in the engine cylinders to vaporize the charge of heavy fuel and air without the addition of outside heat, when the engine is running at from about one-third full load to two-thirds full load (this figure varying for different engine designs), and on up to full load. Below the loads mentioned it is impossible to properly vaporize the charge in the cylinder without preheating.

It is therefore my object, as above set forth, to provide means for preheating the mixture of fuel and air on its way to the engine cylinder, preferably by subjecting such mixture to the heat of the exhaust gases, until such time as the throttle is opened and the compression increased to a point where the heat therefrom combined with the heat of the inner walls of the engine cylinder, is sufficient to properly vaporize the charge inside the cylinders. It is understood that where the heavier fuels are used, the engine will be started and operated a short time with gasoline to warm the manifold and cylinder walls.

It is also the purpose of my device to produce such a structure having parts adjustable so that the preheating can be regulated and gradually increased or reduced, and may be entirely cut off at full load or when maximum power is required.

With these and other objects in view, my invention consists in the construction, arrangement and combination of the various parts of the device, whereby the objects contemplated are attained, as hereinafter more fully set forth, pointed out in my claims, and illustrated in the accompanying drawings, in which:

Figure 1 shows a side elevation of an intake and exhaust manifold of an internal combustion engine equipped with a device embodying my invention, in vertical cross section.

Figure 2 shows a side elevation of part of the device, taken from the side opposite to that illustrated in Figure 1.

Figure 3 shows a horizontal sectional view taken on the line 3—3 of Figure 2, and Figure 4 shows an elevation of the heating coil.

In the accompanying drawings I have used the reference numeral 10 to indicate generally the intake manifold of an internal combustion engine of the plural cylinder type, with the twin inlet tubes or ports 19ᵃ.

Adjacent to the intake manifold 10 is the exhaust manifold 11, from which extends the exhaust pipe 12.

Connected to the intake manifold 10 is a tubular passage 13, which may be connected by means of a pipe 14 with an ordinary carburetor 15.

Arranged in the exhaust pipe 12 is a cylindrical hollow casing 16, preferably made in two halves longitudinally divided and arranged to be connected together by means of bolts extended through pairs of adjacent flanges 17.

Mounted in the casing 16 is a heating coil 18, from the lower end of which extends a tube 19 leading to and communicating with the passage 13. From the upper end of the coil 18 a tube 20 leads to and communicates with the passage 13 at a point above the tube 19. The tubes 19 and 20 with the coil 18 together form a by-pass which communicates with the passage 13 at separated points between which is the main valve hereinafter described.

Mounted within the passage 13 is a main valve 21, preferably of the butterfly type, the stem 22 of which extends through the walls of the passage 13. On the stem 22 of the valve 21 is an arm 23, to which is connected a spring 24 for normally yieldingly holding the valve 21 in a position to close the passage 13. The valve 21 is preferably so arranged that the upwardly passing mixture strikes against it when it is closed, and is deflected toward the opening into the tube 19, as illustrated in Figure 1.

On the stem 22 is another arm 25, in which is a slot 26, said arm being preferably integral with the arm 23.

In the tube 19 is mounted a by-pass valve 27, preferably of the butterfly type, by means of a stem 29 which extends through the walls of the tube 19 and has on its outer end an arm 28. Pivotally connected with the arm 28 is a link 30, one end of which is bent and extends through the slot 26, as illustrated in Figures 1, 2 and 3, thus forming a lost motion connection between the valves 21 and 27.

The parts are so arranged that when the valve 21 is held in closed position by means of the spring 24, the valve 27 may be either opened or closed without changing the valve 21 from its closed position.

Connected with the arm 25 is an actuating device in the form of a control rod 31, connected to the hand or foot throttle or governor, depending upon the installation and control of the engine. The arm 28 has a plurality of holes 32 to selectively receive the bent end of the link 30, whereby an adjustment of the parts may be had.

In the practical operation of my improved device the rod 31 is actuated for opening the valve 27 by the hand throttle or governor, or other suitable means, during the starting and operation of the engine. The movement of the link 30 during the opening movement of the valve 27 has no effect on the valve 21, for the reason that the bent end of the link 30 travels in the slot 26 a sufficient distance during such opening without affecting the valve 21. After starting the engine, it may be operated up to one-third to two-thirds load with the valve 21 closed, depending upon the design of the engine, and size of the passage 19. During such operation the incoming fuel mixture travels through the tube 19, the coil 18 and the tube 20, and thence to the intake manifold. The mixture is thoroughly heated in the tube 18 by the downwardly passing exhaust gases.

When more power is required the rod 31 may be moved toward the arm 25 far enough to cause said arm to be moved, thereby partly opening the valve 21 and allowing a part of the incoming mixture to pass directly to the intake manifold 10, without passing through the passage 19, the coil 18 and the passage 20.

It will be seen that by means of the actuating device 31 the by-pass valve 27 and the main valve 21 may be opened in succession in the order named, and that a considerable variety of adjustments of the valves 21 and 27 may be had. The valve 21 may be left partly open, and the valve 27 may be left partly open. When the engine is at or near full load and the heat in the cylinder is sufficient to vaporize the charge taken into the cylinder, the valve 21 may be moved to fully opened position, whereupon the valve 27 will have been moved substantially a quarter turn from its position shown in Figure 1, and to its second closed position, whereupon the full charge will pass directly through the tubular passage 13 to the intake manifold without going through the heating coil.

It will be noted that by selectively connecting the link 30 with the arm 28 by using different holes 32, a great variety of adjustments of the parts may be secured.

In the operation of my invention the valves described may be actuated for gradually opening the passage through the heating tube or coil so that the fuel mixture is heated by the exhaust gases before passing the intake manifold and thence to the cylinders. Then there comes a time in the operation of the valves when part of the fuel will pass directly from the carburetor through the passage 13 to the intake manifold without being preheated. Further operations of the valves result in the gradual closing of the passages into the heating tubes and the consequent reduction of the amount of fuel mixture that is preheated and the increase of the amount of fuel mixture that is supplied directly from the carburetor to the intake manifold.

It is apparent from the foregoing that my invention has several advantages in the improved carburetion of the fuel for internal combustion engines.

With my invention it is possible to get smooth and uniform, as well as economical operation at low load or part load, and to get similar smooth operation and economical operation and also maximum power at full load, in a greater degree than is possible with the ordinary carbureting apparatus, and especially where the heavier grades of fuel are employed.

It is also apparent that with my invention it is possible to carry a higher compression in the cylinder, with consequent increase in power and economy and without the danger of self ignition or detonation, due to the heat of compression, which has heretofore been a limiting factor with methods of combustion which heat the mixture at full load.

My invention is very flexible in application. In my drawings I have shown one structure in which the invention may be embodied, and it is my belief that my invention is broad enough in principle to cover not only the structure shown and described but also such modifications or mechanical equivalents as may be included within the scope of my claims, without departing from the essential spirit of the invention.

I claim as my invention:

1. An apparatus for supplying fuel to the cylinder of an internal combustion engine, comprising a fuel supply passage having direct communication with the cylinder, an exhaust passage leading from said cylinder, a by-pass connected at its ends with said fuel supply passage at separated points, and intermediately passing through said exhaust passage, a main valve in said fuel supply passage between the points of connection therewith of said by-pass, for controlling the flow of gas through said supply passage, a valve in said by-pass for regulating the flow of gas therethrough, and means connected with said valves and operable to open or close said main valve and to regulate the flow of gas through said by-pass while the flow of gas directly to the cylinder through said fuel supply passage is cut off.

2. An apparatus for supplying fuel to the cylinder of an internal combustion engine, comprising a fuel supply passage having direct communication with the cylinder, an exhaust passage leading from said cylinder, a by-pass connected at its ends with said fuel supply passage at separated points, and intermediately passing through said exhaust passage, a main valve in said fuel supply passage between the points of connection therewith of said by-pass, for controlling the flow of gas through said supply passage, a valve in said by-pass for regulating the flow of gas therethrough, and means connected with said valves and operable to adjust the by-pass valve to regulate the flow of gas through said by-pass while the flow of gas directly to the cylinder through said fuel supply passage is cut off, and to open said main valve and close said by-pass valve when said fuel supply passage is fully open.

3. An apparatus for supplying fuel to the cylinder of an internal combustion engine, comprising a fuel supply passage having direct communication with the cylinder, an exhaust passage leading from said cylinder, a by-pass connected at its ends with said fuel supply passage at separated points, and intermediately passing through said exhaust passage, a main valve in said fuel supply passage between the ends of said by-pass, said valve being operable to wholly or partially close said fuel supply passage, a valve in said by-pass adjustable to vary the effective area of the by-pass and means, comprising a lost motion connection between said valves, operable to adjust said by-pass valve while said main valve remains closed.

4. An apparatus for supplying fuel to the cylinder of an internal combustion engine, comprising a fuel supply passage having direct communication with the cylinder, an exhaust passage leading from said cylinder, a by-pass connected at its ends with said fuel supply passage at separated points, and intermediately passing through said exhaust passage, a main valve in said fuel supply passage between the ends of said by-pass, said valve being operable to wholly or partially close said fuel supply passage, a valve in said by-pass adjustable independently of said main valve to vary the effective area of the by-pass, and a single actuating device operable to open said by-pass and main valves in succession in the order named.

5. An apparatus for supplying fuel to the cylinder of an internal combustion engine, comprising a fuel supply passage having direct communication with the cylinder, an exhaust passage leading from said cylinder, a by-pass connected at its ends with said fuel supply passage at separated points, and intermediately passing through said exhaust passage, a main valve in said fuel supply passage between the ends of said by-pass, said valve being operable to wholly or partially close said fuel supply passage, a valve in said by-pass adjustable independently of said main valve to vary the effective area of the by-pass, means connected with said by-pass valve for actuating the same, and a lost motion connection between said valves.

6. An apparatus for supplying fuel to the cylinder of an internal combustion engine, comprising a fuel supply passage having direct communication with the cylinder, an exhaust passage leading from said cylinder, a by-pass connected at its ends with said fuel supply passage at separated points, and intermediately passing through said exhaust passage, a main valve in said fuel supply passage between the ends of said by-pass, said valve being operable to wholly or partially close said fuel supply passage, a valve in said by-pass adjustable independently of said main valve to vary the effective area of the by-pass, a single actuating device operable to open said by-pass and main valves in succession and a spring for normally closing the main valve.

Des Moines, Iowa, April 9, 1919.

HAROLD E. McCRAY.

ing the same, and a lost motion connection between said valves.

6. An apparatus for supplying fuel to the cylinder of an internal combustion engine, comprising a fuel supply passage having direct communication with the cylinder, an exhaust passage leading from said cylinder, a by-pass connected at its ends with said fuel supply passage at separated points, and intermediately passing through said exhaust passage, a main valve in said fuel supply passage between the ends of said by-pass, said valve being operable to wholly or partially close said fuel supply passage, a valve in said by-pass adjustable independently of said main valve to vary the effective area of the by-pass, a single actuating device operable to open said by-pass and main valves in succession and a spring for normally closing the main valve.

Des Moines, Iowa, April 9, 1919.

HAROLD E. McCRAY.

Certificate of Correction.

It is hereby certified that in Letters Patent No. 1,533,196, granted April 14, 1925, upon the application of Harold E. McCray, of Waterloo, Iowa, for an improvement in "Carbureting Devices," errors appear in the printed specification requiring correction as follows: Page 1, line 45, for the word "was" read *were;* page 4, line 19, claim 6, after the word "succession" insert the words *in the order named;* and that the said Letters Patent should be read with these corrections therein that the same may conform to the record of the case in the Patent Office.

Signed and sealed this 26th day of May, A. D. 1925.

[SEAL.]

KARL FENNING,
*Acting Commissioner of Patents.*

Certificate of Correction.

It is hereby certified that in Letters Patent No. 1,533,196, granted April 14, 1925, upon the application of Harold E. McCray, of Waterloo, Iowa, for an improvement in "Carbureting Devices," errors appear in the printed specification requiring correction as follows: Page 1, line 45, for the word "was" read *were;* page 4, line 19, claim 6, after the word "succession" insert the words *in the order named;* and that the said Letters Patent should be read with these corrections therein that the same may conform to the record of the case in the Patent Office.

Signed and sealed this 26th day of May, A. D. 1925.

[SEAL.]

KARL FENNING,
*Acting Commissioner of Patents.*